(12) United States Patent
Kehtarnavaz et al.

(10) Patent No.: US 8,743,235 B2
(45) Date of Patent: Jun. 3, 2014

(54) ADAPTIVE AUTOMATIC EXPOSURE APPARATUS AND METHOD FOR DIGITAL IMAGES

(75) Inventors: Nasser Kehtarnavaz, Frisco, TX (US); Mohammad T. Rahman, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 242 days.

(21) Appl. No.: 13/505,389

(22) PCT Filed: Nov. 4, 2010

(86) PCT No.: PCT/US2010/055481
§ 371 (c)(1),
(2), (4) Date: May 1, 2012

(87) PCT Pub. No.: WO2011/056994
PCT Pub. Date: May 12, 2011

(65) Prior Publication Data
US 2012/0212642 A1    Aug. 23, 2012

Related U.S. Application Data

(60) Provisional application No. 61/258,080, filed on Nov. 4, 2009.

(51) Int. Cl.
*H04N 5/228* (2006.01)

(52) U.S. Cl.
USPC .................................... 348/222.1; 348/229.1

(58) Field of Classification Search
CPC ....... H04N 9/045; H04N 5/232; H04N 5/772; H04N 5/335; H04N 5/23293
See application file for complete search history.

(56) References Cited

U.S. PATENT DOCUMENTS

| | | | |
|---|---|---|---|
| 5,093,716 A | 3/1992 | Kondo et al. | |
| 5,115,269 A | 5/1992 | Masanaga et al. | |
| 5,387,930 A | 2/1995 | Toh | |
| 5,592,256 A | 1/1997 | Muramatsu | |

(Continued)

FOREIGN PATENT DOCUMENTS

| | | |
|---|---|---|
| EP | 1339020 A1 | 8/2003 |
| JP | 2007306083 A | 11/2007 |

(Continued)

OTHER PUBLICATIONS

Gamadia, M., et al., "A Real-Time Continuous Automatic Focus Algorithm for Digital Cameras," IEEE, (2006, pp. 163-167.

(Continued)

*Primary Examiner* — Twyler Haskins
*Assistant Examiner* — Fayez Bhuiyan
(74) *Attorney, Agent, or Firm* — Daniel J. Chalker; Chalker Flores, LLP (57) ABSTRACT

An apparatus and method for automatically adjusting an exposure for a digital imaging device by (a) receiving a current image frame using an exposure value (EV), (b) computing a current image spatial entropy (ISE) for the current image frame, and (c) whenever the current ISE is greater than a previous ISE, setting the previous ISE equal to the current ISE, increasing the EV, and repeating steps (a) and (b), and (d) whenever the current ISE is less than or equal to the previous ISE, decreasing the EV, receiving the current image frame using the EV, and displaying the current image frame.

23 Claims, 9 Drawing Sheets

(56) References Cited

U.S. PATENT DOCUMENTS

| | | | |
|---|---|---|---|
| 5,596,387 | A | 1/1997 | Takagi |
| 6,775,405 | B1 | 8/2004 | Zhu |
| 6,839,087 | B1 | 1/2005 | Sato |
| 6,970,199 | B2 | 11/2005 | Venturino et al. |
| 7,263,222 | B2 | 8/2007 | Manbeck et al. |
| 7,433,532 | B2 | 10/2008 | Truitt et al. |
| 7,460,702 | B2 | 12/2008 | Hamahashi et al. |
| 7,474,785 | B2 | 1/2009 | Wu et al. |
| 8,094,211 | B2 * | 1/2012 | Kwon et al. ............... 348/229.1 |
| 8,184,924 | B2 * | 5/2012 | Tsuruoka ..................... 382/274 |
| 2004/0085341 | A1 * | 5/2004 | Hua et al. ...................... 345/723 |
| 2005/0286802 | A1 * | 12/2005 | Clark et al. ................... 382/286 |
| 2009/0091661 | A1 | 4/2009 | Wu et al. |

FOREIGN PATENT DOCUMENTS

| | | |
|---|---|---|
| JP | 2008219230 A | 9/2008 |
| JP | 2009298681 A | 12/2009 |
| KR | 20070105028 A | 10/2007 |

OTHER PUBLICATIONS

Kehtarnavaz, N., et al., "Development and Real-Time Implementation of a Rule-Based Auto-Focus Algorithm," Real-Time Imaging 9, (2003), pp. 197-203.

Kremens, Robert, et al., "System Implications of Implementing Auto-Exposure on Consumer Digital Cameras," Proceedings of SPIE Electronic Imaging, Jan. 1999, vol. 3650, pp. 100-107.

Kuno, Tetsuya, et al., "A New Automatic Exposire System for Digital Still Cameras," IEEE Transactions on Consumer Electronics, Feb. 1998, vol. 44, No. 1, pp. 192-199.

Liang, Jia Yi, et al., "An Auto-Exposure Algorithm for Detecting High Contrast Lighting," IEEE, (2007), pp. 725-728.

Nguyen, Thuy Tuong, et al., "Automatic Exposure Compensation for Line Detection Applications," Proceedings of IEEE International Conference on Multisensor Fusion and Integration for Intelligent Systems, Aug. 20-22, 2008, pp. 68-73.

Rahman, et al., "Hybrid Real-Time Face Detection for Mobile Devices," Proceedings of IEEE ICIP Conference, Nov. 2009, 5 pages.

Razlighi, Qolamreza R., et al., "Computation of Image Spatial Entropy Using Quadrilateral Markov Random Field," IEEE Transactions on Image Processing, Dec. 2009, vol. 18, No. 12, pp. 2629-2639.

Razlighi, Qolamreza R., et al., "Fast Computation Methods for Estimation of Image Spatial Entropy," J. Real-Time Image Processing, (2009), 6 pages.

Shannon, C.E., "A Mathematical Theory of Communication," The Bell System Technical Journal, Oct. 1948, vol. 27, pp. 379-423, 623-656.

Stark, J. Alex, "Adaptive Image Contrast Enhancement Using Generalizations of Histogram Equalization," IEEE Transactions on Image Processing, May 2000, vol. 9, No. 5, pp. 889-896.

International Search Report and Written Opinion for PCT/US2010/055481, dated Jul. 27, 2011, 8 pages.

* cited by examiner

ADAPTIVE AUTOMATIC EXPOSURE APPARATUS AND METHOD FOR DIGITAL IMAGES

CROSS-REFERENCE TO RELATED APPLICATIONS

This application is a National Stage of International Application No. PCT/US2010/055481 filed Nov. 4, 2010 which claims priority to and the benefit of U.S. Provisional Application No. 61/258,080, filed Nov. 4, 2009. The contents of each of which are incorporated by reference in their entirety.

FIELD OF INVENTION

The present invention relates generally to the field of digital imaging and, more particularly, to an adaptive automatic exposure apparatus and method for digital images.

BACKGROUND ART

Getting proper image exposure is a critical component of a digital or cell-phone camera image pipeline. In professional photography, the right exposure is normally decided manually either by visual inspection or by using an external exposure meter. However, in point-and-shoot digital and cell-phone cameras, an auto exposure (AE) module is used to automatically set the exposure level without any user intervention.

A number of AE methods have appeared in the literature [1-5], where the emphasis is placed on choosing the right Exposure Value (EV). EV is related to the aperture f-number F and exposure duration T according to this equation $$EV = \log_2\left(\frac{F^2}{T}\right) \quad (1)$$

There are normally two different AE modes in cameras called shutter priority and aperture priority which allow setting the exposure based on a fixed shutter speed or lens aperture size, respectively. Most cell-phone cameras use a fixed aperture size lens.

Any digital or cell phone camera possesses its own EV table. The main challenge in AE is to choose a proper EV regardless of the scene lighting condition. Existing AE algorithms use the relationship between Brightness Value (BV) and EV. As discussed in [5], BV is proportional to exposure duration T and is inversely proportional to the square of f-number F. Hence, one can write this relationship between EV and BV $$EV_{optizmum} = EV_{current} + \log_2(BV_{current}) - \log_2(BV_{optimum}) \quad (2)$$

where the subscript optimum denotes the final optimum exposure under which a picture is to be taken and current denotes a current exposure. Based on Equation (2), the existing AE algorithms first take a picture with some EV, determine the BV from that picture and calculate an optimum EV using a predefined optimum BV.

Basically, different existing algorithms calculate BV and its optimum value in different ways. Mean luminance (both for green G and luminance Y channel), center-weighted mean and median luminance approaches have been widely used to serve as the optimum BV. In these algorithms, the optimum BV is considered to be the mid-level (e.g., 128 for 8-bit images). The use of mid-level brightness generates a proper exposure for scenes where the average intensity for all parts of the image is similar. However, for scenes where the average intensity for different parts of the image varies, this approach leads to getting overexposed or underexposed images. Furthermore, this one step conventional approach to reach the optimum EV is based on the assumption that there is a linear relationship between EV and BV, which does not hold under all lighting conditions.

Various statistics such as variance and entropy have been used to measure the information content of an image in a wide range of image processing applications. For example, in [6], an entropy based gamma correction technique was discussed. An entropy filter was used for sharpness or edge measurement in [7] and for line detection in [8]. Most applications using entropy have utilized it in a post processing manner with real-time operation not being a concern.

For the auto exposure application, the statistics mean luminance has been widely used due to its simplicity and low computational complexity [1-5, 9-13]. However, the mean luminance based methods fail to perform satisfactorily in all lighting conditions. More specifically, the performance of existing auto exposure methods degrades considerably in poor lighting conditions including frontlit, backlit or lowlight conditions. Accordingly, a new auto exposure method, named adaptive auto exposure, is needed to overcome the shortcomings of the existing methods.

Accordingly, there is a need for a more efficient and economical system to generate electricity from solar energy.

SUMMARY OF THE INVENTION

The present invention provides an Adaptive AE that addresses the AE problem more effectively by defining the optimum EV to be the one that maximizes the image information content. In addition, a search procedure is used to reach the optimum EV, thus easing the linearity assumption between EV and BV. This improved real-time AE method uses a new definition of image spatial entropy which is capable of adapting or coping with various lighting conditions that may occur in real-world scenes. As a result, the optimum exposure value for single-shot, continuous, and face-priority modes of auto exposure can be obtained. This is achieved by searching for the maximum spatial entropy level as exposure value is changed.

The present invention provides an automatic exposure apparatus that includes a shutter, a shutter controller connected to the shutter to open and close the shutter, an image sensor aligned with the shutter to detect an image through the shutter whenever the shutter is open, a memory storing a set of device parameters, and a processor connected to the shutter controller, the image sensor and the memory. The processor: (a) receives a current image frame from the image sensor using an exposure value (EV) for the shutter, (b) computes a current image spatial entropy (ISE) for the current image frame, (c) whenever the current ISE is greater than a previous ISE, (i) sets the current ISE equal to the previous ISE, (ii) increases the EV, and (iii) repeats steps (a) and (b), and (c) whenever the current ISE is less than or equal to the previous ISE, (i) decreases the EV, (ii) receives the current image frame using the EV, and (iii) displays the current image frame. The apparatus may also include an adjustable aperture aligned with the image sensor, wherein the adjustable aperture is controlled by the shutter controller.

In addition, the present invention provides a method for automatically adjusting an exposure for a digital imaging device by (a) receiving a current image frame using an exposure value (EV), (b) computing a current image spatial entropy (ISE) for the current image frame, (c) whenever the current ISE is greater than a previous ISE, setting the previous ISE equal to the current ISE, increasing the EV, and repeating steps (a) and (b), and (d) whenever the current ISE is less than or equal to the previous ISE, decreasing the EV, receiving the current image frame using the EV, and displaying the current image frame. This method can be implemented by a computer readable medium encoded with a computer program wherein the steps are performed by one or more code segments.

The present invention is described in detail below with reference to the accompanying drawings.

BRIEF DESCRIPTION OF THE DRAWINGS

Further benefits and advantages of the present invention will become more apparent from the following description of various embodiments that are given by way of example with reference to the accompanying drawings:

FIGS. 3-5 depict a sample image sequence with different EVs (FIGS. 3A, 4A and 5A) and corresponding histograms of luminance channel (FIGS. 3B, 4B and 5B);

FIGS. 10-12 depict an image sequence of single-shot AE (FIGS. 10A, 11A and 12A) along with entropy (FIGS. 10B, 11B and 12B in accordance with the prior art) and ISE (FIGS. 10C, 11C and 12C in accordance with the present invention) graphs where the bold black line in the middle graph indicates the maximum entropy position;

FIGS. 13-15 are sample continuous AE images (FIGS. 13A, 14A and 15A) and ISE graphs (FIGS. 13B, 14B and 15B) showing changes in lighting level for the same scene in accordance with one embodiment of the present invention;

FIGS. 16-18 are sample continuous AE images (FIGS. 16A, 17A and 18A) and ISE graphs (FIGS. 16B, 17B and 18C) showing lighting changes due to camera panning in accordance with one embodiment of the present invention;

FIGS. 19-21 depicts an adaptive AE based on entire image area (FIGS. 19A and 19B), adaptive face-priority AE based on detected face area (FIGS. 20A and 20B), and adaptive face-priority AE (FIG. 21) by combining (FIG. 19A) and (FIG. 20A) in accordance with one embodiment of the present invention;

FIG. 23 depicts images of a sample poor lighting scene with a conventional mean luminance AE outcome (FIG. 23A) and introduced adaptive AE outcome (FIG. 23B) in accordance with one embodiment of the present invention.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides an Adaptive AE that addresses the AE problem more effectively by defining the optimum EV to be the one that maximizes the image information content. In addition, a search procedure is used to reach the optimum EV, thus easing the linearity assumption between EV and BV. This improved real-time AE method uses a new definition of image spatial entropy which is capable of adapting or coping with various lighting conditions that may occur in real-world scenes. As a result, the optimum exposure value for single-shot, continuous, and face-priority modes of auto exposure can be obtained. This is achieved by searching for the maximum spatial entropy level as exposure value is changed.

Exposure Value (EV) can be changed either by controlling the shutter opening time and/or aperture size. For the same scene, when EV is varied, the image statistics mean luminance, median luminance, variance, and entropy change. These statistics can be computed from the image histogram which is often made available via a hardware histogram engine in many camera image pipelines. In the absence of such an engine, the image histogram can be easily computed via software though at the expense of a higher processing time.

Figure 1:
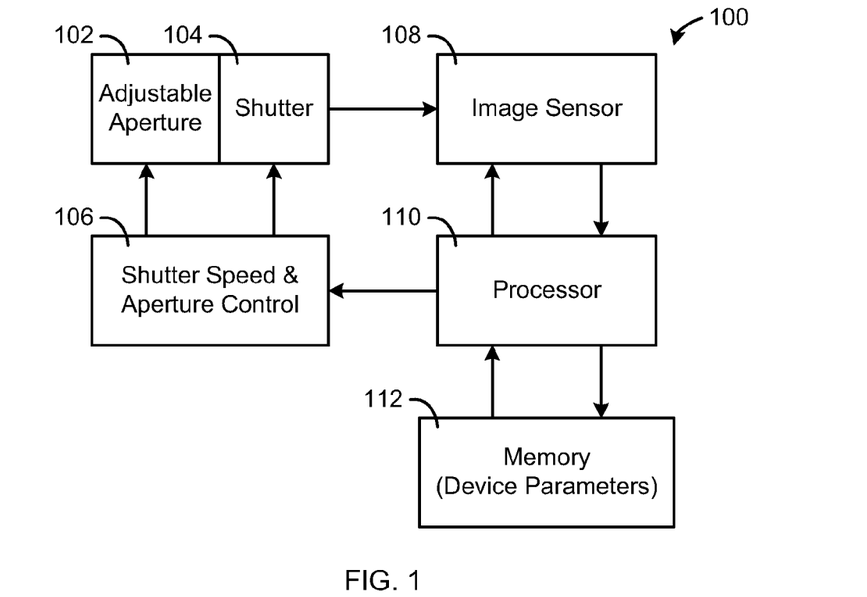
FIG. 1 is a block diagram depicting an automatic exposure apparatus in accordance with one embodiment of the present invention.

Now referring to FIG. 1, a block diagram depicting an automatic exposure apparatus 100 in accordance with one embodiment of the present invention is shown. The automatic exposure apparatus 100 includes an adjustable aperture 102 and/or a shutter 104 that are collectively controlled by a shutter speed and aperture controller 106 which typically uses preset EVs (specific aperture 102 and/or shutter 104 settings) to control the exposure of a digital image. Note that some devices only adjust the speed of the shutter 104 and do not have an adjustable aperture 102. An image or optical sensor 108, such as a CCD or CMOS, etc., is aligned with the aperture 102 and/or shutter 104 to detect an image through the aperture 102 and/or shutter 104 (when open). The optical sensor 108 is communicably coupled to a processor, controller or central processing unit (CPU) 110. The processor 110 is communicably coupled to the shutter speed and aperture controller 106 and a memory 112 storing a set of device parameters. The automatic exposure apparatus 100 can be integrated into a digital camera (still or video), a cell-phone camera, a computer, a personal data assistant, a mobile communication device, a hand-held device, or a vehicle. As will be described in more detail below, the processor 110 performs various steps in accordance with the methods taught herein.

Figure 2:
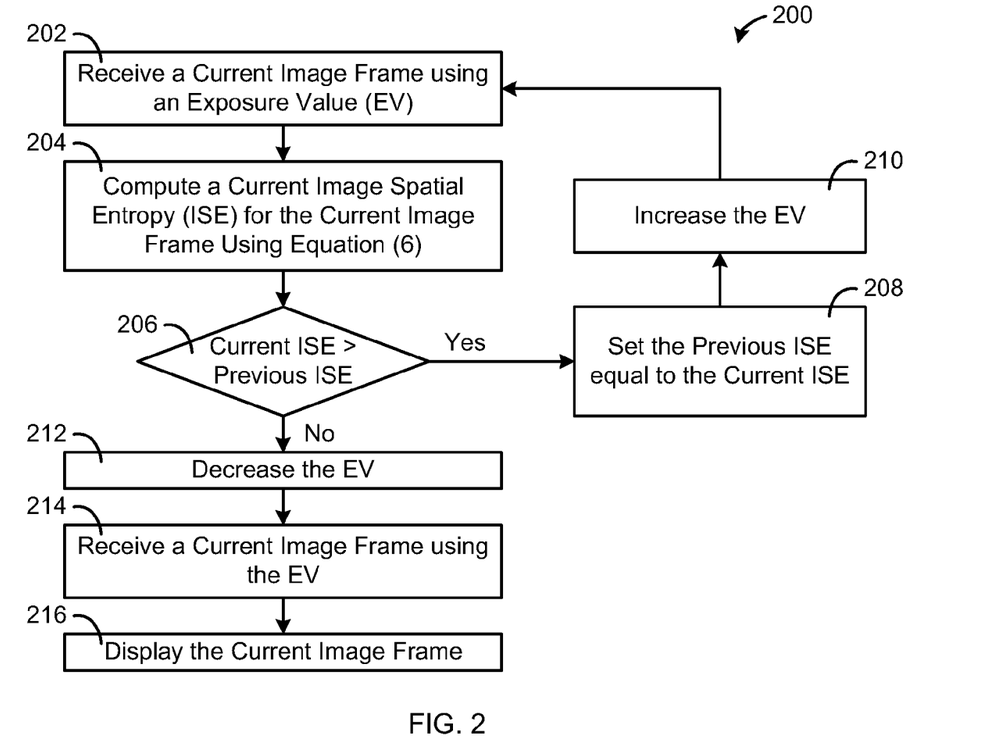
FIG. 2 is a flow chart depicting a method for automatically adjusting an exposure for a digital imaging device in accordance with one embodiment of the present invention.

Referring now to FIG. 2, a flow chart depicting a method for automatically adjusting an exposure for a digital imaging device in accordance with one embodiment of the present invention is shown. A current image frame using an exposure value (EV) is received in block 202. A current image spatial entropy (ISE) for the current image frame is computed using Equation 6 (see below) in block 204. If the current ISE is greater than a previous ISE, as determined in decision block 206, the previous ISE is set equal to the current ISE in block 208, the EV is increased in block 210, and the process returns to block 202 to receive a current image frame using the increased EV and the process repeats. If, however, the current ISE is less than or equal to the previous ISE, as determined in decision block 206, the EV is decreased in block 212, the current image frame using the decreased EV is received in block 214, and the current image frame is displayed in block 216. ISE and various experiments related thereto will now be described in more detail. This method can be implemented by a computer readable medium encoded with a computer program wherein the steps are performed by one or more code segments.

Figure 3A:
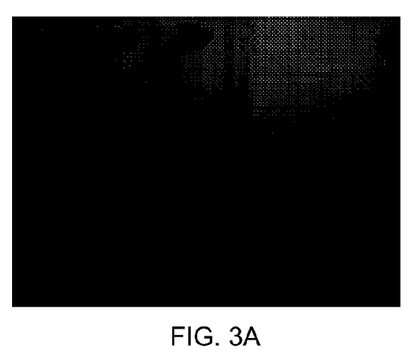
Figure 3B:
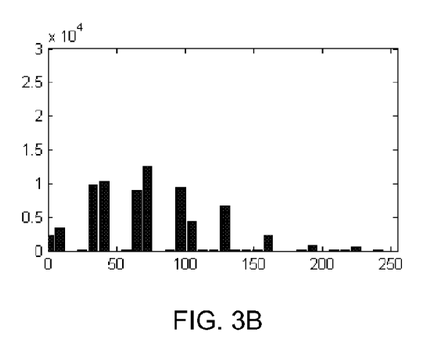
Figure 4A:
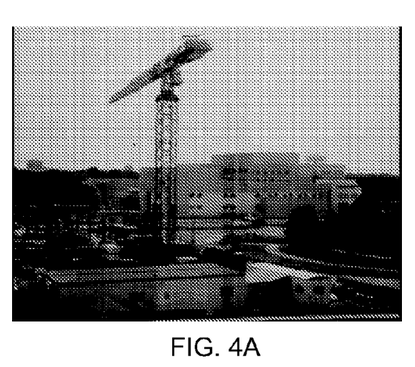
Figure 4B:
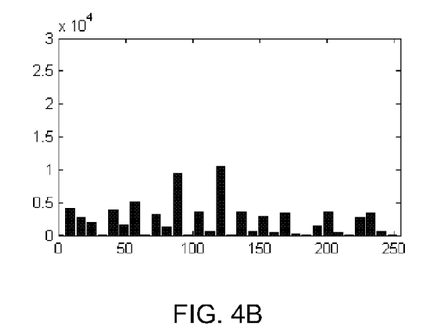
Figure 5A:
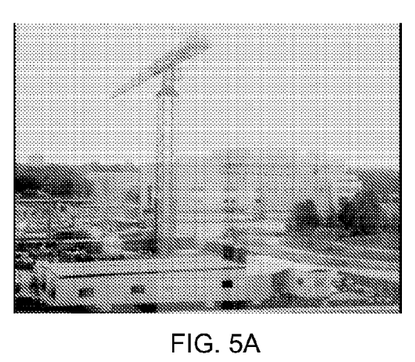
Figure 5B:
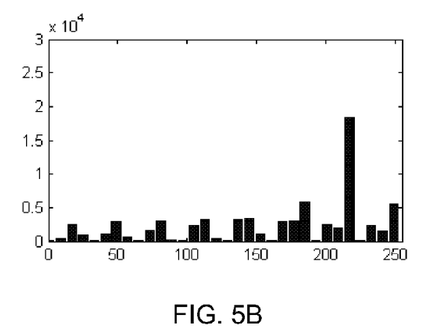

Referring now to FIG. 3-5, snapshots of a sample image sequence (FIGS. 3A, 4A and 5A) along with the histograms (FIGS. 3B, 4B and 5B) of the luminance channel (Y) for three different exposure values are shown. Due to the high computation and memory demands associated with using 3D color histograms, in practice, one normally uses only the luminance or the green channel, noting that the idea is applicable to 3D color histograms. In the experiments described herein, luminance was considered due to its more effective representation of image brightness than the green channel.

Figure 6A:
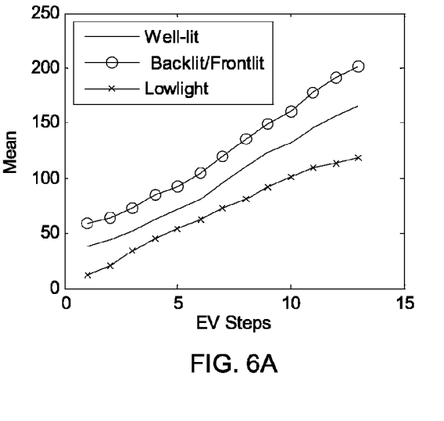
FIGS. 6A and 6B are graphs depicting typical changes in mean brightness (FIG. 6A) and median brightness (FIG. 6B) as EV steps are varied.
Figure 6B:
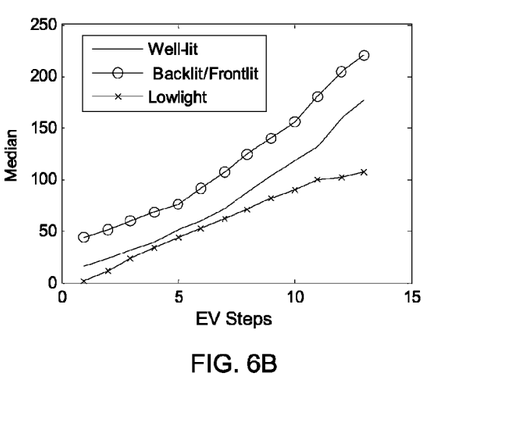

From FIGS. 3-5, one can see that a histogram biased to the left or right indicates an underexposed or overexposed image. On the other hand, an evenly stretched histogram indicates a properly exposed image. FIGS. 6A and 6B shows how mean and median values typically change as EV steps are varied. Note that the graphs depicted herein represent change across a range of EV steps and do not reflect the actual EV values. As a result, the EV is varied in steps to find the best EV for a particular scene given a certain EV range for a camera. Three curves are shown in these figures, which correspond to (i) well-lit (solid line without symbols), (ii) backlit/frontlit (solid line o symbols), and (iii) lowlight (solid line with x symbols) lighting conditions.

As mentioned earlier, most of the existing AE methods use the mid-gray level approach, operating based on the assumption that the EV corresponding to the middle mean or median luminance provides the optimum EV. The mid-gray level approach works satisfactory under well-lit lighting conditions. With the present invention, a search procedure is deployed in order to reach the mid-gray level without making the above assumption or without using Equation (2). A search procedure is more effective as the use of the above assumption often does not lead to obtaining well-exposed images in poor lighting conditions such as frontlit, backlit or lowlight conditions. It should also be noted that any mid-gray level approach discussed in the literature, including center-weighted mean or region of interest (ROI)-weighted mean [5], exhibit similar outcomes under poor lighting conditions.

Entropy is a measure of image information content that has been used in many image processing applications. Here, we have utilized this measure for the auto exposure application. Entropy is a measure of uncertainty. A higher value of entropy denotes more information content or a better image contrast. Shannon's entropy H for a discrete random variable X representing an image with k gray levels $\{x_1, x_2, \ldots, x_k\}$ is defined as [14]

$$H(X) = \sum_{i=1}^{k} p(x_i) \log_2 \frac{1}{p(x_i)} \tag{3}$$

where p denotes the image probability density function estimated by its histogram.

Figure 7:
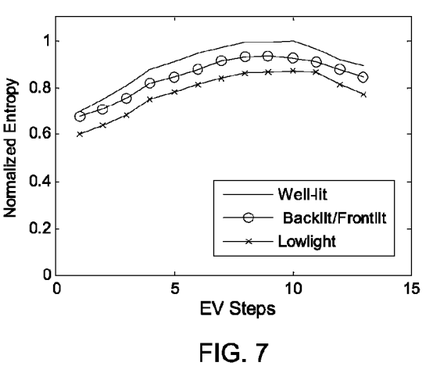
FIG. 7 is a graph depicting a typical change in image entropy as EV steps are varied.
Figure 8:
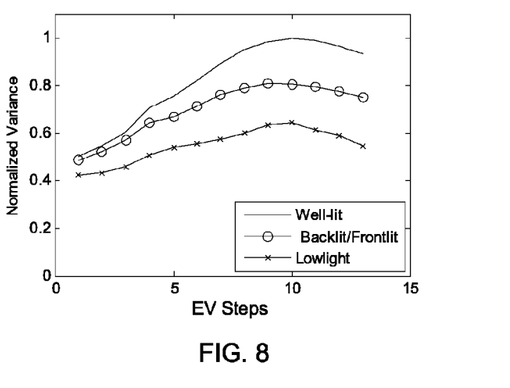
FIG. 8 is a graph depicting a typical change in image variance as EV steps are varied.

FIG. 7 shows how entropy typically changes when EV steps are varied for three different lighting conditions: (i) well-lit (solid line without symbols), (ii) backlit/frontlit (solid line o symbols), and (iii) lowlight (solid line with x symbols). As can be seen from FIG. 7, this measure exhibits a peak from which the optimum EV can be obtained in an adaptive manner by carrying out a real-time on-the-fly search of the peak. Image variance is another measure which has been used in many image processing applications. Image variance can be estimated from its histogram as follows:

$$V(X) = \sum_{i=1}^{n} (x_i - \mu) p(x_i) \tag{4}$$

where $\mu$ denotes the mean luminance value. FIG. 8 shows how image variance typically changes when EV steps are varied under three different lighting conditions: (i) well-lit (solid line without symbols), (ii) backlit/frontlit (solid line o symbols), and (iii) lowlight (solid line with x symbols) lighting conditions. Though this measure also exhibits a peak, both the objective and subjective evaluation discussed later indicate that this measure is not as effective as entropy.

As mentioned above, the present invention uses the newly defined image spatial entropy (ISE) [15]. ISE provides a more accurate estimation of the true entropy based on Quadrilateral Markov Random Field (QMRF). This measure is briefly covered below.

Let $X^a$ and $X^b$ denote two discrete random variables, each representing k intensity values in an image. The joint entropy between $X^a$ and $X^b$ is given by $$H(X^a, X^b) = \sum_{i=1}^{k} \sum_{j=1}^{k} p(x_i^a, x_j^b) \log_2 \frac{1}{p(x_i^a, x_j^b)} \tag{5}$$

Based on the above joint entropy definition, ISE for an image of size n×m is given by $$ISE(X) = \tag{6}$$
$$nmH(X, X_u) + \frac{nm}{2}(H(X_r/X) + H(X_l/X) - H(X_l, X_u) - H(X_r, X_u))$$

where $H(X, X_u)$ denotes the joint entropy of X with its upper neighbor, $H(X_l/X)$ and $H(X_r/X)$ the conditional entropy of left and right neighbors given X, $H(X_l/X_u)$ the joint entropy of left and upper neighbors of X, and $H(X_r, X_u)$ the joint entropy of right and upper neighbors of X. The conditional entropies for left and right neighbors are defined as $$H(X_l/X)=H(X_l,X)-H(X) \quad (7)$$

$$H(X_r/X)=H(X_r,X)-H(X) \quad (8)$$

Figure 9A:
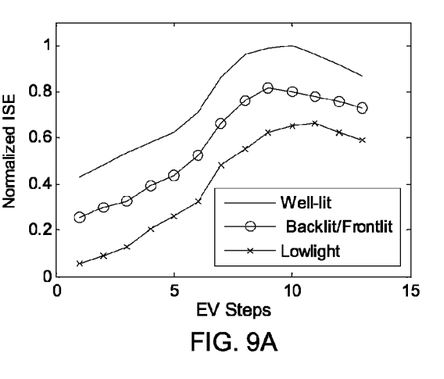
FIGS. 9A and 9B are graphs depicting a typical change in ISE as EV steps are varied (FIG. 9A) and dynamic range difference between Entropy and ISE for a sample scene as EV steps are varied (FIG. 9B) in accordance with one embodiment of the present invention.
Figure 9B:
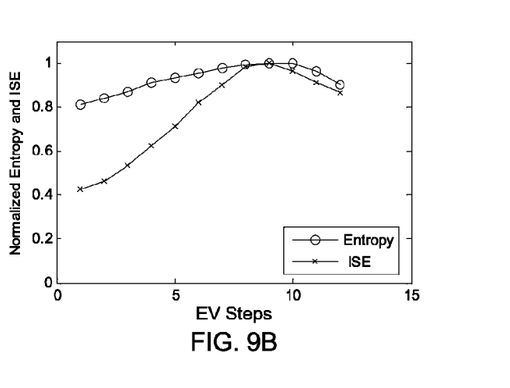

As can be seen from FIGS. 9A and 9B, ISE shows more dynamic range than the conventional entropy as EV steps are varied. As a result, the peak can be found easier during the search process.

For real-time operation on a digital or cell-phone camera processor, initially one can use the conventional entropy to get the peak in a time-efficient manner and then switch to the spatial image entropy to detect the shifting of the peak due to noticeable changes in lighting conditions. This approach allows the real-time constraint to be met without using any dedicated hardware engine. Alternatively, in order to achieve real-time operation while making use of the higher dynamic range of ISE, the fast estimation method of computing ISE introduced in [16] together with the rule-based search technique in [17] can be combined. The following describes how the ISE measure is used to achieve single-shot AE, continuous AE and face-priority AE for an improved and comprehensive AE solution.

In single-shot AE, upon half pressing the camera shutter button or upon power-up, EV is varied from the lowest exposure setting towards the highest exposure setting in appropriate exposure steps as allowed by the camera. For each EV, the ISE is computed using Equation (6). The EV that corresponds to the peak position of ISE is then identified and used to serve as the optimum EV. This process is similar to single-shot auto focus (AF), where upon half pressing the camera shutter button, the focus motor is moved and a sharpness function is computed for each focus motor position. The focused position is then found by locating the peak of the sharpness function. The same concept in single-shot AF is considered here to achieve single-shot AE.

At this point, it is worth discussing the use of conventional entropy for image optimization that was reported in [18]. To reduce computational complexity, entropy of the gradient image was used based on the assumption that maximizing entropy of the gradient image corresponds to maximizing entropy of the original image. There is no theoretical basis supporting this claim. In fact, a different conclusion was reached in a more recent work in [5], where it is shown that entropy of image and entropy of gradient image do not generate the same outcome. Furthermore, as the computation of variance is more computationally efficient, variance was used to find the maximum entropy based on another assumption that variance and entropy produce the same solution. Again, there is no theoretical basis for this claim and our experimentations have shown that entropy and variance generate different outcomes, in particular in poor lighting conditions under consideration here.

Figure 10A:
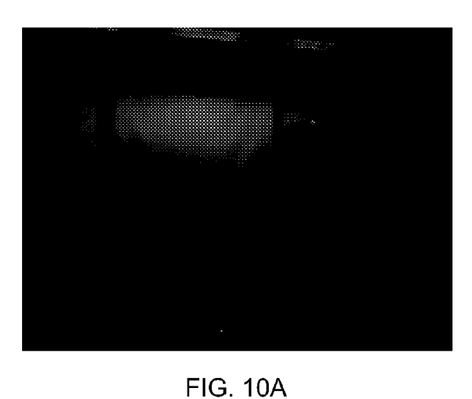
Figure 10B:
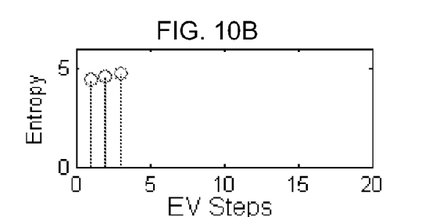
Figure 10C:
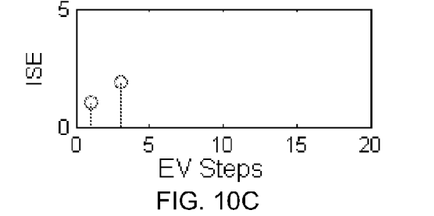
Figure 11A:
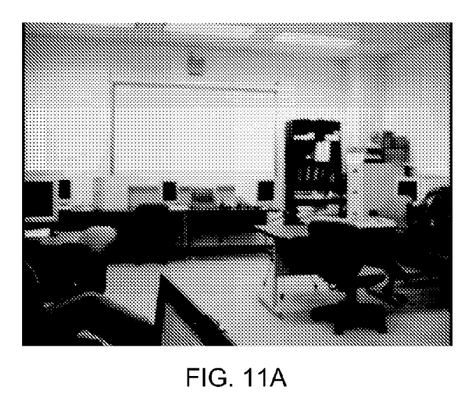
Figure 11B:
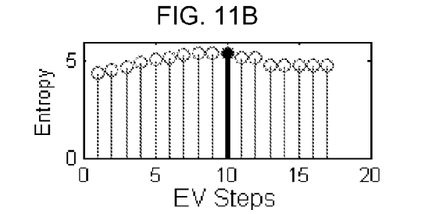
Figure 11C:
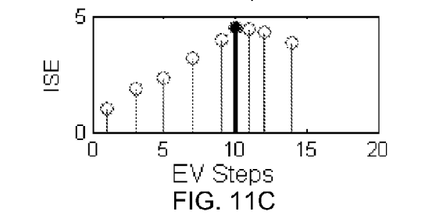
Figure 12A:
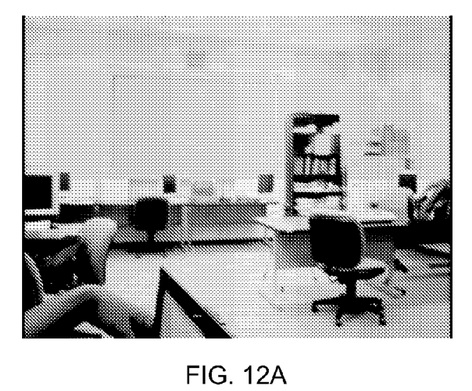
Figure 12B:
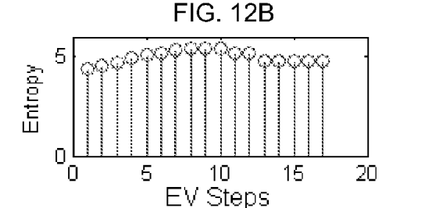
Figure 12C:
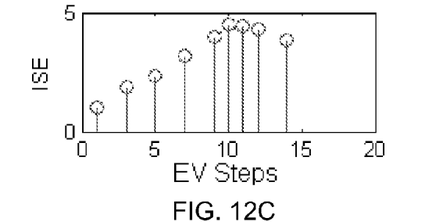

In the present invention, rather than using Equation (2), a search procedure similar to auto focus search [17] is used to reach the peak value of image spatial entropy (ISE). Due to the higher dynamic of ISE, the search process can reach the peak position in fewer numbers of iterations or steps as compared to using the conventional entropy measure. FIG. 10-12 shows a sample run or image sequence (FIGS. 10A, 11A and 12A) of the single-shot AE in accordance with the present invention on an actual digital camera development platform together with the entropy (FIGS. 10B, 11B and 12B) and ISE graphs (FIGS. 10C, 11C and 12C) of each image. The middle image (FIG. 11A) denotes the exposure setting corresponding to the maximum entropy (FIG. 11B) and ISE level (FIG. 11C). As seen in these figures, in general, while both entropy and ISE reach the same exposure solution, fewer iterations are required by using ISE.

Noting that ISE exhibits a better defined peak as compared to the conventional entropy, we have used it to achieve continuous AE as well. After reaching the peak in single-shot AE, the mode can be switched to continuous AE. This mode does not require computing ISE for each exposure value rather ISE is computed only when there is a noticeable change in the scene lighting condition. In other words, after the initial peak is reached, the continuous AE mode is activated which involves looking for a shift in the peak position along both directions as a result of a noticeable change in the lighting condition similar to continuous AF reported in [19]. A narrower search domain of EV is used in continuous AE as it only takes a few steps or computations of ISE to find a shift in the peak position. That is to say, in the continuous mode, only a small portion of the entire EV domain is searched and the higher computational burden of ISE does not pose a real-time implementation limitation, whereas the higher dynamic range of ISE as compared to the conventional entropy allows detecting the shift in the peak position more effectively.

Figure 13A:
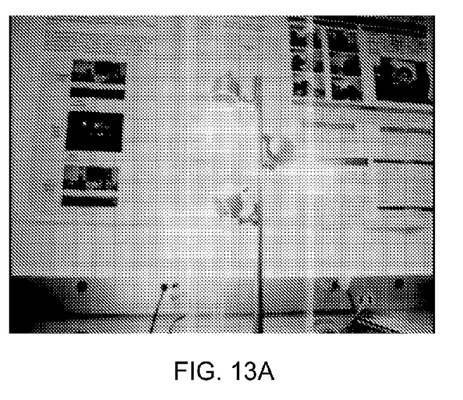
Figure 13B:
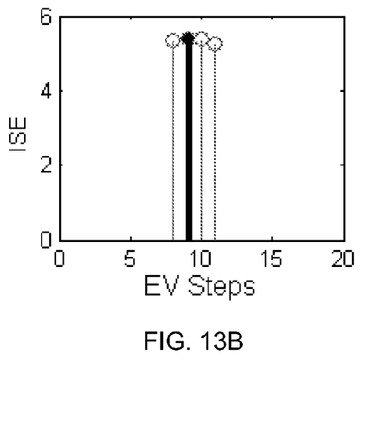
Figure 14A:
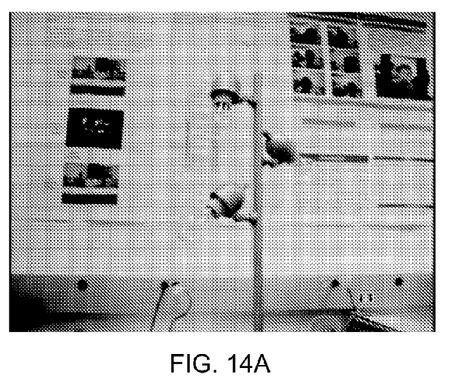
Figure 14B:
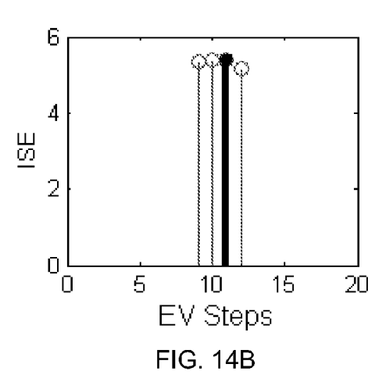
Figure 15A:
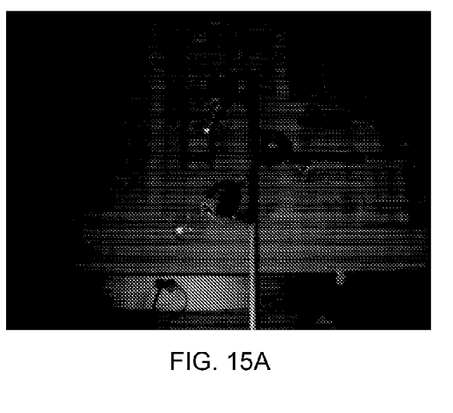
Figure 15B:
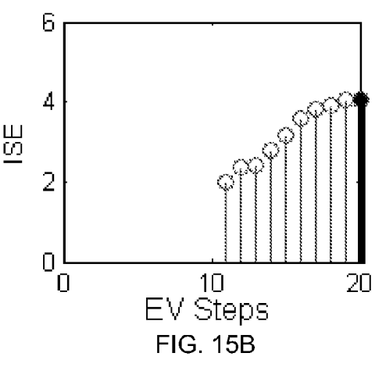
Figure 16A:
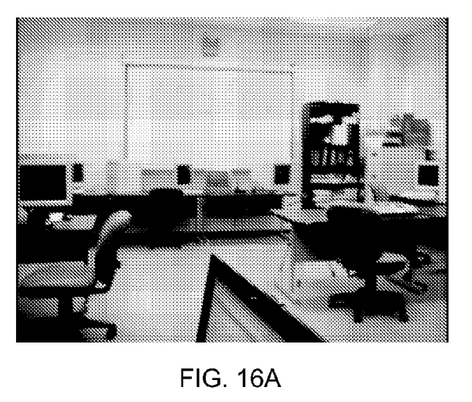
Figure 16B:
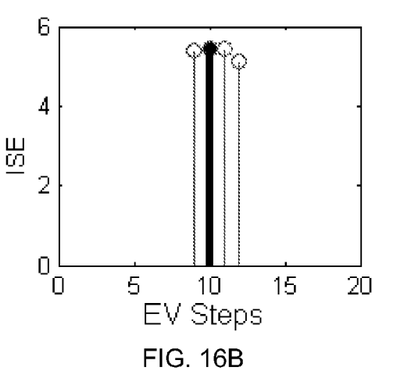
Figure 17A:
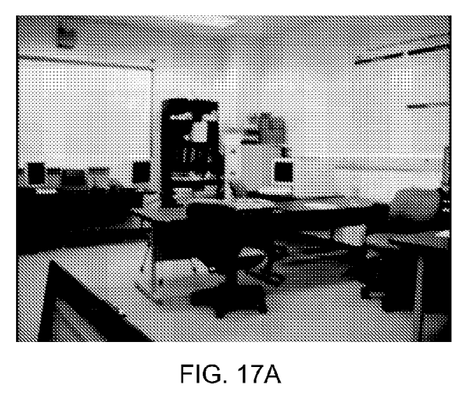
Figure 17B:
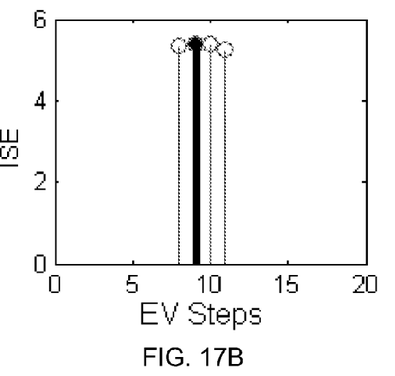
Figure 18A:
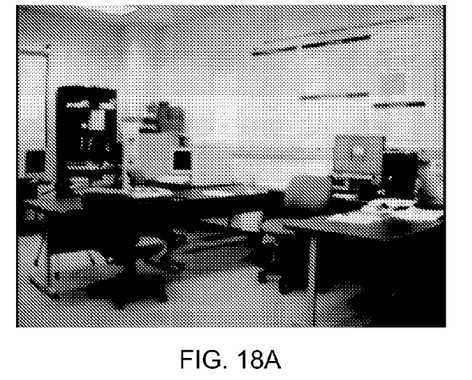
Figure 18B:
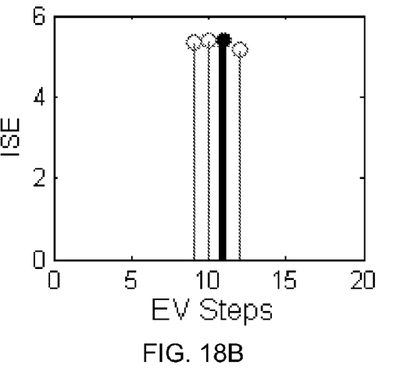

FIGS. 13-15 provides a sample continuous AE image sequence (FIGS. 13A, 14A and 15A) along with ISE graphs (FIGS. 13B, 14B and 15B) when the lighting level of the same scene is changed. As can be seen from the ISE graphs (FIGS. 13B, 14B and 15B), in the continuous mode, the search starts from the previous peak position rather than from an initial low exposure setting. This allows reaching the new peak more efficiently or faster. FIGS. 16-18 provides another sample image sequence (FIGS. 16A, 17A and 18A) of continuous AE along with ISE graphs (FIGS. 16B, 17B and 18B) where the lighting condition is changed due to the panning of the camera.

When some object of interest such as faces is present in the image, it is possible to measure ISE for the area in which the object lies, or for a region-of-interest (ROI). This way, the entire AE process can be run based on the information collected from the ROI. This would lead to an exposure value that is optimum for that area. In other words, a specific area can be given the priority for setting the exposure value. Considering that a large percentage of pictures are taken from faces, the area in which faces are detected can be considered to achieve face-priority AE. The introduced adaptive AE method can be combined with any existing or future face detection technique, such as the hybrid face detection technique [20], to achieve face-priority AE.

Figure 19A:
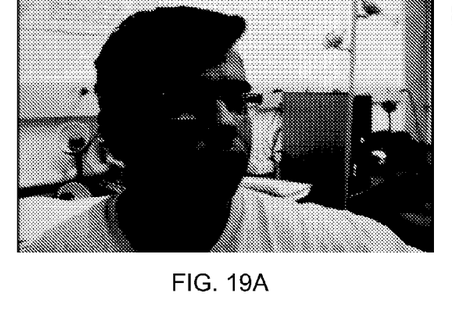
Figure 19B:
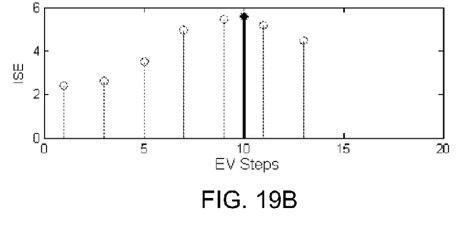
Figure 20A:
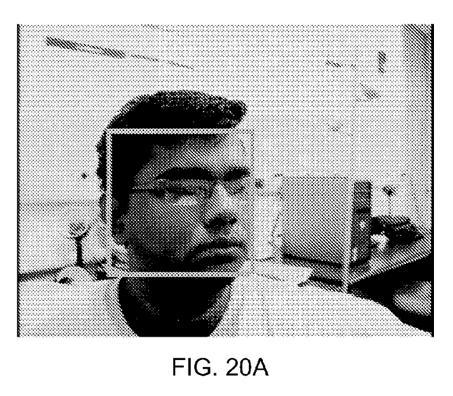
Figure 20B:
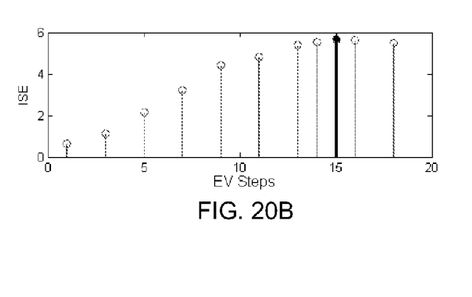
Figure 21:
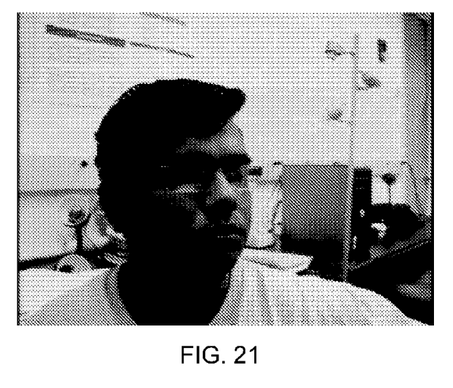

FIGS. 19 and 20 show a sample image along with the ISE graph when using the entire image area (FIGS. 19A and 19B) and when using the face area (FIGS. 20A and 20B), respectively, based on which the entropy is computed. When using the entire image area, the optimum EV is found based on all the pixels both from the face and the background areas. When using the face area, the optimum EV is found based on only the pixels from the face area thus allowing a better exposure of the face area while the background area may get slightly overexposed or underexposed. It is also possible to set the exposure by taking the average of the EV values of the face and background areas. This alternative face-priority AE is shown in FIG. 21 where the face area appears better exposed than FIG. 19A while the background appears less overexposed than FIG. 20A.

Figure 22A:
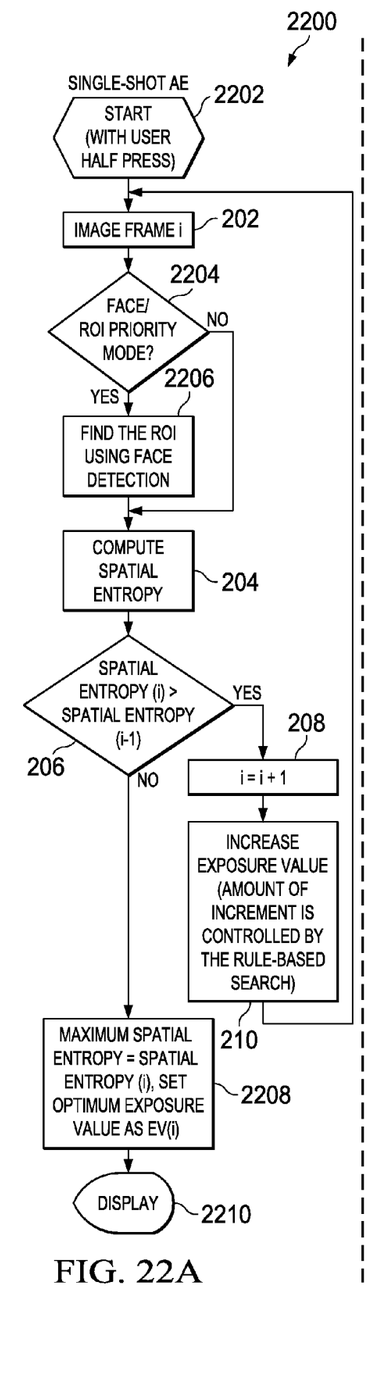
FIG. 22A depicts an adaptive AE flowchart showing after performing single-shot or face-priority AE in accordance with one embodiment of the present invention.
Figure 22B:
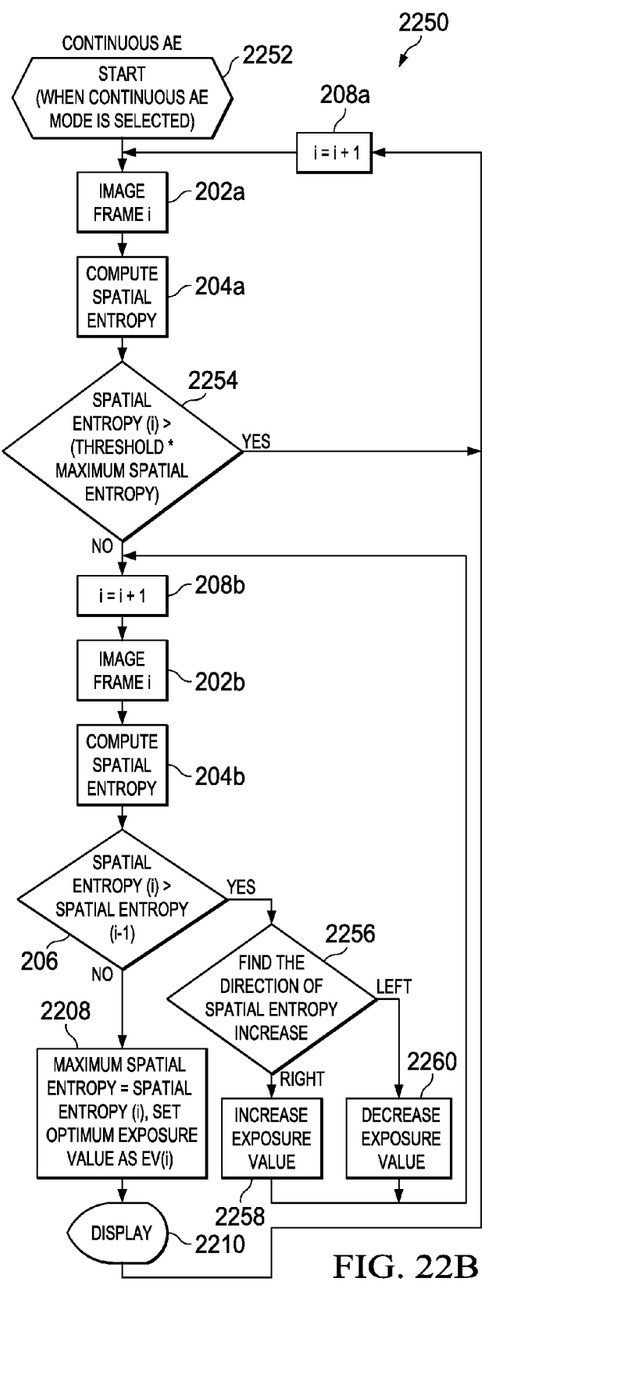
FIG. 22B depicts an adaptive AE flowchart showing after continuous AE is activated by constantly monitoring a noticeable percentage change in image spatial entropy in accordance with one embodiment of the present invention.

FIG. 22 shows a flow chart of the introduced adaptive AE using image spatial entropy which includes the above three modes: single-shot (FIG. 22A), continuous (FIG. 22B), and face-priority (FIG. 22A). In single-shot mode (FIG. 22A), first an initial image frame is captured with some default EV or an EV near low end. The image spatial entropy is computed for that frame. If the ROI or face priority mode is enabled, then it is computed from the ROI or face area only. The initial value of maximum image spatial entropy is set to zero. Next, if the image spatial entropy value of a current frame becomes greater than that of the previous one, the EV is increased until the peak value is reached, or there is a decrease in the entropy value. The EV corresponding to the peak entropy is used as the optimum EV and the picture is taken under this exposure setting. The process can be controlled via half pressing the camera shutter button or automatically. The right side of the flowchart shows the continuous AE operation. In continuous mode (FIG. 22B), after reaching the peak position, the image spatial entropy is monitored continuously. The first run of the continuous AE is similar to the single-shot AE operation in that an optimum EV is set for the maximum spatial entropy value. The right side of the flow chart shows the operation after this first run when a previous maximum value of the spatial entropy is already known. If the image spatial entropy value drops from this maximum value due to a noticeable change in the scene lighting, a search for the new peak position starts.

More specifically, the single-shot AE process 2200 of FIG. 22A starts in block 2202 where the user half presses the camera shutter button. A current image frame using an exposure value (EV) is received in block 202. If a face/region-of-interest (ROI) mode is set, as determined in decision block 2204, the ROI is found using face detection in block 2206 and a current image spatial entropy (ISE) for the current image frame is computed using Equation 6 (see above) in block 204. If, however, the face/ROI mode is not set, as determined in decision block 2204, the current ISE for the current image frame is computed in block 204. If the current ISE is greater than a previous ISE, as determined in decision block 206, the previous ISE is set equal to the current ISE (i=i+1) in block 208, the EV is increased in block 210, and the process loops back to block 202 to received a new image frame. The amount of EV increment is controlled by a rule-based search. If, however, the current ISE is less than or equal to the previous ISE, as determined in decision block 206, the maximum ISE is set equal to the current ISE(i) and the optimum EV is set equal to EV(i) in block 2208, and the image frame corresponding to the EV(i) is displayed in block 2210. This method can be implemented by a computer readable medium encoded with a computer program wherein the steps are performed by one or more code segments.

More specifically, the continuous AE process 2250 of FIG. 22B starts in block 2252 whenever the continuous AE mode is selected. A current image frame using an exposure value (EV) is received in block 202a. A current image spatial entropy (ISE) for the current image frame is computed using Equation 6 (see above) in block 204a. If the current ISE is greater than a threshold value times a maximum ISE, as determined in decision block 2254, the previous ISE is set equal to the current ISE (i=i+1) in block 208a and the process loops back to block 202a to receive a new image frame. If, however, the current ISE is less than or equal to the threshold value times the maximum ISE, as determined in decision block 2254, the previous ISE is set equal to the current ISE (i=i+1) in block 208b, a current image frame (i) is received in block 202b and a current ISE for the current image frame is computed using Equation 6 (see above) in block 204b. If the current ISE is greater than a previous ISE, as determined in decision block 206, the direction of the ISE increase is determined in block 2256. The EV is either increased in block 2258 or decreased in block 2260 depending on the determined direction of the ISE increase (right or left respectively on the previously depicted graphs). Thereafter, the process returns to block 208b where the previous ISE is set equal to the current ISE (i=i+1) and the process repeats. If, however, the current ISE is less than or equal to the previous ISE, as determined in decision block 206, the maximum ISE is set equal to the current ISE(i) and the optimum EV is set equal to EV(i) in block 2208, and the image frame corresponding to the EV(i) is displayed in block 2210. The process then loops back to block 208a and repeats the previously described process. This method can be implemented by a computer readable medium encoded with a computer program wherein the steps are performed by one or more code segments.

In experiments, it was found that a 10% drop in entropy captures noticeable changes in scene lighting. Of course, this percentage may be changed depending on a desired sensitivity for the camera. For a lower percentage threshold, ISE gets computed frequently and adapts the exposure setting to small changes in scene lighting conditions. For a higher percentage threshold, ISE gets computed infrequently and adapts the exposure setting only to major or dramatic changes in scene lighting conditions. In the continuous mode, EV is varied only around a previously identified peak position to find a new peak position. This operation is bi-directional, i.e., if ISE increases with a step increase of EV (right direction), EV is increased further until ISE reaches the new peak; if ISE decreases with a step increase of EV (left direction), EV is decreased until ISE reaches the new peak. The entire process is repeated if there is another major change in scene lighting; otherwise, the same optimum EV position is maintained.

The introduced adaptive AE method was implemented on an actual digital camera development platform powered by a 200 MHz processor. The AE operation was then done for various scenes under different lighting conditions. Each frame took 120 ms when computing ISE and 77 ms when computing the conventional entropy. However, on average, 7 iterations were needed to reach the peak position in single-short AE when using ISE, as compared to 13 iterations when using the conventional entropy. Hence, the average total time for single-shot AE was 840 ms (1002 ms for conventional entropy) which was about 20% faster than when using the conventional entropy.

Figure 23A:
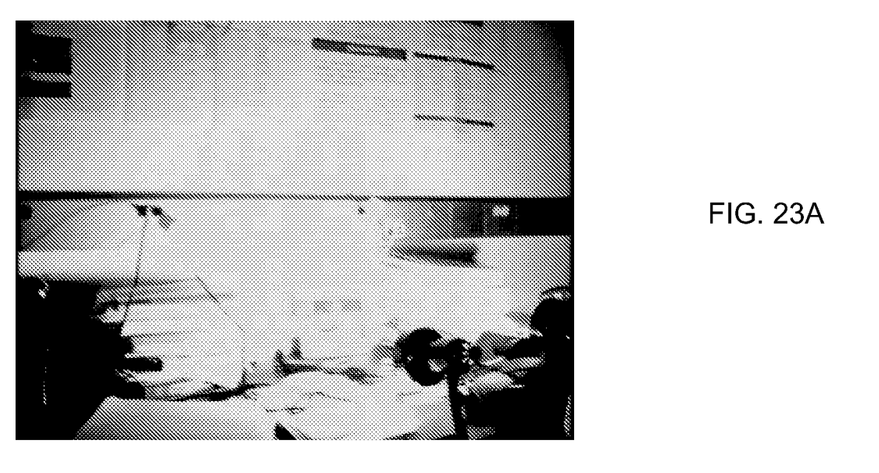
Figure 23B:
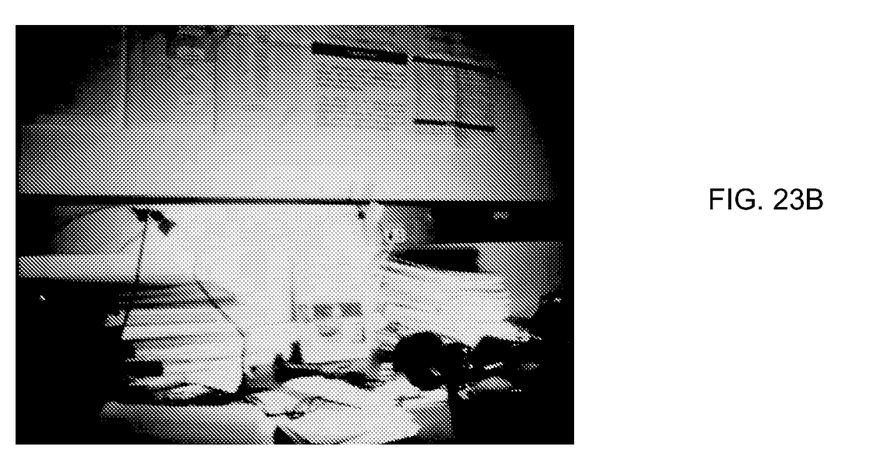

FIG. 23A corresponds to the AE outcome when the mean luminance method was used to set the optimum EV in a frontlit scene. Due to an excessive amount of front lighting, many pixels became saturated while trying to reach the mid luminance level. FIG. 23B corresponds to the AE outcome when our method was used to set the optimum EV. It is easy to see the better exposure setting of FIG. 23B over FIG. 23A.

Figure 24:
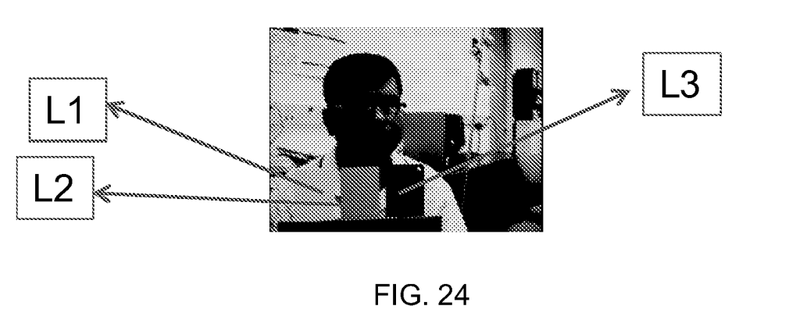
FIG. 24 is an image showing the use of digital gray cards for objective evaluation of AE.

To provide an objective evaluation of any AE method, the standard gray, white and black cards, which are used by photographers as references in order to manually adjust the white balance and exposure, were considered. Each of these digital gray cards is designed to be spectrally neutral under all lighting conditions. FIG. 24 shows a sample scene with the three gray cards whose luminances (Y values in YCbCr color space) are represented by L1, L2, and L3.

Next, the following two performance criteria of contrast and deviation from mid-gray level $L_{mid}$ were computed to provide an objective comparison of the AE methods:

$$\text{Contrast} = 20\log_{10}\left(\frac{L1-L3}{L1}\right) \quad (9)$$

-continued $$\text{Deviation} = 100 \times \frac{|L2 - L_{mid}|}{L_{mid}} \quad (10)$$

Table 1 shows the performance results averaged over 20 different scenes (10 well-lit and 10 poor-lit scenes). As can be seen from this table, for well-lit conditions, our adaptive AE method generated a higher contrast and a smaller deviation from the mid-gray level. The table also shows that the improvements were greater for poor lighting conditions consisting of front, back, low and mixed lighting. FIGS. 16-18 shows the AE outcomes of a sample poor lighting scene for our adaptive AE and the widely used mean luminance AE methods.

In addition, a subjective evaluation was carried out by asking 8 people to examine the AE outcomes for 20 different scenes (10 well-lit and 10 poor-lit scenes) in a blind fashion. They were asked to examine the three optimum EV images that were obtained by the mean, variance and our adaptive AE methods and then assign a score of 3 to the best looking image, 1 to the worst looking image, and 2 in-between. Table 1 lists the average score across all scenes and people. As can be seen from Table 1, our adaptive AE method received a higher average score than the other methods, in particular in poor lighting conditions.

| | Method: | | | | | |
|---|---|---|---|---|---|---|
| | Well-lit | | | Poor-lit | | |
| Criterion: | Mean Luminance AE | Variance AE | Adaptive AE | Mean Luminance AE | Variance AE | Adaptive AE |
| Contrast (dB) | 11.8 | 11.5 | 14.6 | 8.9 | 9.3 | 13.8 |
| Deviation from mid-gray level | 18.1% | 16.9% | 9.7% | 23.1% | 23.8% | 10.3% |
| Subjective Evaluation Average Score | 2.6 | 2.1 | 3.0 | 2.1 | 1.6 | 2.8 |

An adaptive auto exposure method for digital and cellphone cameras has been described herein. Image spatial entropy is used to find the optimum exposure value by searching for the peak entropy level as the exposure value is changed on-the-fly in real-time. The results obtained show that this method can better cope with poor lighting conditions compared with the existing auto exposure methods.

REFERENCES

[1] T. Takagi, "Auto-exposure device of a camera," U.S. Pat. No. 5,596,387, 1997.
[2] M. Muramatsu, "Photometry device for a camera," U.S. Pat. No. 5,592,256, 1997.
[3] K. Sato, "Exposure controller of a digital camera," U.S. Pat. No. 6,839,087B1, 2005.
[4] M. Venturino, E. McGarvey, and M. Vaughn, "Digital camera exposure information acquired from a scene," U.S. Pat. No. 6,970,199B2, 2005.
[5] J. Liang, Y. Qin, and Z. Hong, "An Auto-exposure algorithm for detecting high contrast lighting conditions," *7th International Conference on ASICON*, vol. 1, no. 1, pp. 725-728, October 2007.
[6] D. Wu, "Video Auto enhancing algorithm", U.S. Pat. No. 7,474,785, 2009.
[7] S. Hamahashi, "Entropy filter, and area extraction method using the filter," U.S. Pat. No. 7,460,702, 2008.
[8] T. Nguyen, X. Pham, D. Kim, and J. Jeon, "Automatic exposure compensation for line detection applications," *Proceedings of IEEE International Conference on Multisensory Fusion and Integration for Intelligent Systems*, vol. 1, pp. 68-73, August 2008.
[9] T. Kondo "Digital color video camera with auto-focus, auto-exposure and auto-white balance," U.S. Pat. No. 5,093,716, 1991.
[10] Y. Masanaga, "Camera having luminance difference mode control," U.S. Pat. No. 5,115,269, 1992.
[11] T. Kuno, H. Sugiura, and N. Matoba "A new automatic exposure system for digital still cameras," *IEEE Transactions on Consumer Electronics*, vol. 44, no. 1, pp. 192-199, February 1998.
[12] R. Kremens, N. Sampat, S. Venkataraman, and T. Yeh, "System implications of implementing auto-exposure on consumer digital cameras," *Proceedings of SPIE Electronic Imaging*, vol. 3650, pp. 100-107, January 1999
[13] J. Stark, "Adaptive image contrast enhancement using generalizations of histogram equalization," *IEEE Transactions on Image Processing*, vol. 9, no. 5, pp. 889-896, May 2000.
[14] C. Shannon, "A mathematical theory of communication", *Bell System Technical Journal*, vol. 27, pp. 379-423, 623-656, October 1948.
[15] R. Razlighi, N. Kehtarnavaz, and A. Nosratinia, "Computation of image spatial entropy using quadrilateral Markov random field," in print *IEEE Transactions on Image Processing*, 2009.
[16] R. Razlighi, M. Rahman, and N. Kehtarnavaz, "Fast computation methods for estimation of image spatial entropy," submitted to *Journal of Real Time Imaging*, 2009.
[17] N. Kehtarnavaz, and H. Oh, "Development and real-time implementation of a rule-based auto-focus algorithm," *Real Time Imaging*, vol. 9, no. 3, pp. 197-203, June 2003.
[18] P. Toh, "Electronic image acquisition system with image optimization by intensity entropy analysis and feedback control," U.S. Pat. No. 5,387,930, 1995.
[19] M. Gamadia and N. Kehtarnavaz, "A real-time continuous automatic focus algorithm for digital cameras," *Proceedings of IEEE SSIAI Symposium*, vol. 1, no. 1, pp. 163-167, Denver, March 2006.
[20] M. Rahman, N. Kehtarnavaz, and J. Ren, "A hybrid face detection approach for real-time deployment on mobile devices," *to appear in Proceedings of IEEE ICIP Conference*, November 2009.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

The invention claimed is:

1. An automatic exposure apparatus comprising: a shutter; a shutter controller connected to the shutter to open and close the shutter; an image sensor aligned with the shutter to detect an image through the shutter whenever the shutter is open; a memory storing a set of device parameters; and a processor connected to the shutter controller, the image sensor and the memory, wherein the processor: (a) receives a current image frame from the image sensor using an exposure value (EV) for the shutter, (b) computes a current image spatial entropy (ISE) for the current image frame (c) whenever the current ISE is greater than a previous ISE, (i) sets the current ISE equal to the previous ISE, (ii) increases the EV, and (iii) repeats steps (a) and (b), and (c) whenever the current ISE is less than or equal to the previous ISE, (i) decreases the EV, (ii) receives the current image frame using the EV, and (iii) displays the current image frame, wherein the current ISE is calculated using $$ISE(X)=nmH(X,Xu)+nm/2(H(Xr/X)+H(Xl/X)-H(Xl,Xu)-H(Xr,Xu)).$$

2. The automatic exposure apparatus as recited in claim 1, further comprising an adjustable aperture aligned with the image sensor, wherein the adjustable aperture is controlled by the shutter controller.

3. The automatic exposure apparatus as recited in claim 1, wherein the processor also initializes the current ISE and the previous ISE.

4. The automatic exposure apparatus as recited in claim 1, wherein an amount of increase or decrease in EV is controlled by a rule-based search.

5. The automatic exposure apparatus as recited in claim 1, wherein the processor finds a region-of-interest (ROI) using a face detection method whenever a face/ROI priority mode is enabled.

6. The automatic exposure apparatus as recited in claim 1, wherein the apparatus operates in a single shot mode or a continuous mode.

7. The automatic exposure apparatus as recited in claim 1, wherein the processor:
step (c) further comprises the step of determining a direction of increased ISE, and the step of decreasing the EV comprises the step of increasing or decreasing the EV based on the determined direction of increased ISE; and
the step of decreasing the EV in step (d) is replaced with decreasing or increasing the EV to reverse the prior change in EV.

8. The automatic exposure apparatus as recited in claim 7, wherein the processor continuously monitors the current ISE, and whenever a change in the current ISE exceeds a threshold value, determines a new EV that corresponds to a maximum ISE and displays the current image frame using the new EV.

9. The automatic exposure apparatus as recited in claim 1, wherein the automatic focusing apparatus is integrated into a digital camera, a cell-phone camera, a computer, a personal data assistant, a mobile communication device, a hand-held device, or a vehicle.

10. A method for automatically adjusting an exposure for a digital imaging device, the method comprising the steps of: (a) receiving a current image frame using an exposure value (EV); (b) computing a current image spatial entropy (ISE) for the current image frame; (c) whenever the current ISE is greater than a previous ISE, setting the previous ISE equal to the current ISE, increasing the EV, and repeating steps (a) and (b); (d) whenever the current ISE is less than or equal to the previous ISE, decreasing the EV, receiving the current image frame using the EV, and displaying the current image frame, wherein the current ISE is calculated using $$ISE(X)=nmH(X,Xu)+nm/2(H(Xr/X)+H(Xl/X)-H(Xl,Xu)-H(Xr,Xu)).$$

11. The method as recited in claim 10, further comprising the step of initializing the current ISE and the previous ISE.

12. The method as recited in claim 10, wherein an amount of increase or decrease in EV is controlled by a rule-based search.

13. The method as recited in claim 10, further comprising the step of finding a region-of-interest (ROI) using a face detection method whenever a face/ROI priority mode is enabled.

14. The method as recited in claim 10, wherein the method is performed in a single shot mode or a continuous mode.

15. The method as recited in claim 10, wherein:
step (c) further comprises the step of determining a direction of increased ISE, and the step of decreasing the EV comprises the step of increasing or decreasing the EV based on the determined direction of increased ISE; and
the step of decreasing the EV is replaced with decreasing or increasing the EV to reverse the prior change in EV.

16. The method as recited in claim 15, further comprising the steps of:
continuously monitoring the current ISE; and
whenever a change in the current ISE exceeds a threshold value, determining a new EV that corresponds to a maximum ISE and displaying the current image frame using the new EV.

17. A non-transitory computer readable medium encoded with a computer program for execution by a processor for automatically adjusting an exposure for a digital imaging device, the computer program comprising: (a) a code segment for receiving a current image frame using an exposure value (EV); (b) a code segment for computing a current image spatial entropy (ISE) for the current image frame; (c) a code segment for whenever the current ISE is greater than a previous ISE, setting the previous ISE equal to the current ISE, increasing the EV, and repeating steps (a) and (b); (d) a code segment for whenever the current ISE is less than or equal to the previous ISE, decreasing the EV, receiving the current image frame using the EV, and displaying the current image frame, wherein the current ISE is calculated using $$ISE(X)=nmH(X,Xu)+nm/2(H(Xr/X)+H(Xl/X)-H(Xl,Xu)-H(Xr,Xu)).$$

18. The computer program as recited in claim 17, further comprising a code segment for initializing the current ISE and the previous ISE.

19. The computer program as recited in claim 17, wherein an amount of increase or decrease in EV is controlled by a rule-based search.

20. The computer program as recited in claim 17, further comprising a code segment of finding a region-of-interest (ROI) using a face detection method whenever a face/ROI priority mode is enabled.

21. The computer program as recited in claim 17, wherein the computer program is executed in a single shot mode or a continuous mode.

22. The computer program as recited in claim 17, wherein:
   the code segment (c) further comprises the step of determining a direction of increased ISE, and the step of decreasing the EV comprises the step of increasing or decreasing the EV based on the determined direction of increased ISE; and
   the code segment for decreasing the EV is replaced with decreasing or increasing the EV to reverse the prior change in EV.

23. The computer program as recited in claim 22, further comprising:
   a code segment for continuously monitoring the current ISE; and
   a code segment for whenever a change in the current ISE exceeds a threshold value, determining a new EV that corresponds to a maximum ISE and displaying the current image frame using the new EV.

* * * * *